United States Patent [19]

Endo et al.

[11] Patent Number: 5,169,694

[45] Date of Patent: Dec. 8, 1992

[54] COMPOSITE MULTILAYER GLASS SHEET FOR MOTOR VEHICLES

[75] Inventors: Masaaki Endo; Masao Mizutani, both of Osaka, Japan

[73] Assignee: Nippon Sheet Glass Co., Ltd., Osaka, Japan

[21] Appl. No.: 464,939

[22] Filed: Jan. 16, 1990

[30] Foreign Application Priority Data

Jan. 18, 1989 [JP] Japan .................................. 1-3955[U]

[51] Int. Cl.⁵ .......................... C03C 27/06; E06B 3/66
[52] U.S. Cl. ...................................... 428/34; 428/426; 428/428; 428/432; 428/437; 428/216; 428/913; 428/446; 52/171; 52/304
[58] Field of Search .................. 350/1.6, 1.7, 164, 166; 428/34, 38, 426, 428, 432, 430, 433, 436, 441, 442, 216, 437, 460, 913; 52/171, 304

[56] References Cited

U.S. PATENT DOCUMENTS

| | | | |
|---|---|---|---|
| 2,011,557 | 8/1935 | Anderegg | 428/34 |
| 2,106,251 | 1/1938 | Ludwig | 428/34 |
| 3,537,944 | 11/1970 | Grubb et al. | 350/1.7 |
| 3,682,528 | 8/1972 | Apfel et al. | 350/1.7 |
| 3,758,185 | 9/1973 | Gelber | 350/1.7 |
| 3,846,152 | 11/1974 | Fanz | 350/1.7 |
| 3,889,026 | 6/1975 | Groth | 428/437 |
| 3,978,273 | 8/1976 | Groth | 350/164 |
| 4,035,608 | 7/1977 | Stromquist et al. | 52/171 |
| 4,048,978 | 9/1977 | Plumat et al. | 350/1.6 |
| 4,144,684 | 3/1979 | Kirkbride et al. | 428/428 |
| 4,226,910 | 10/1980 | Dahlen et al. | 428/430 |
| 4,340,646 | 7/1982 | Ohno et al. | 428/428 |
| 4,382,177 | 5/1983 | Heaney | 350/166 |
| 4,487,197 | 12/1984 | Hogois | 428/433 |
| 4,786,783 | 11/1988 | Woodward | 219/547 |
| 4,799,745 | 1/1989 | Meyer et al. | 350/1.7 |
| 4,973,511 | 11/1990 | Farmer et al. | 428/216 |

FOREIGN PATENT DOCUMENTS

59-173893 11/1984 Japan .
60-157890 10/1985 Japan .
2201428A 9/1988 United Kingdom .

Primary Examiner—Ellis P. Robinson
Assistant Examiner—Archene Turner
Attorney, Agent, or Firm—Merchant, Gould, Smith, Edell, Welter & Schmidt

[57] ABSTRACT

A composite multilayer glass sheet for use as a window glass in a motor vehicle includes an outer glass layer facing outside the motor vehicle, an inner glass layer facing inside the motor vehicle, the inner glass layer extending parallel to the outer glass layer and being spaced from the outer glass layer with an air layer defined therebetween, and a nonreflective film disposed on a surface of at least the outer glass layer which faces the air layer. A resin film is applied to a surface of the inner glass layer for making the inner glass layer mechanically stronger.

5 Claims, 1 Drawing Sheet

COMPOSITE MULTILAYER GLASS SHEET FOR MOTOR VEHICLES

BACKGROUND OF THE INVENTION

1. Field of the Invention

The present invention relates to a composite multilayer glass sheet, and more particularly to a composite multilayer glass sheet for use as a window glass on a motor vehicle.

2. Description of the Prior Art

Known composite multilayer glass sheets are disclosed in Japanese Laid-Open Utility Model Publications Nos. 59(1984)-173893 and 60(1985)-157890, for example. As shown in FIG. 4 of the accompanying drawings, such a conventional composite multilayer glass sheet comprises an outer glass layer G1, an inner glass layer G2, and a spacer 100 interposed between and bonded to peripheral edge portions of the outer and inner glass layers G1, G2, with an air layer 101 defined therebetween. A sealing member 102 fills the space between the peripheral edges of the outer and inner glass layers G1, G2 just outside of the spacer 100.

If the prior art composite multilayer glass sheets are used directly as motor vehicle window glasses, however, they suffer from the following disadvantages:

Usually, motor vehicle window glasses are single tempered or laminated glasses. If the composite multilayer glass sheet is used as a motor vehicle window glass, then light, indicated by l in FIG. 4, from within the passenger compartment is reflected by the surface of the inner glass layer G1 which faces the air layer 101. As a result, double or triple images that are slightly out of mutual alignment are reflected by the window glass, making visibility through the window glass poor. A front window glass, or a windshield, is particularly required to include a glass laminate to meet safety standards. If a laminated glass is used as the inner glass layer G1, then the front window glass comprises a total of three glass layers. Therefore, the front window glass which includes a laminated glass is thick and heavy.

SUMMARY OF THE INVENTION

In view of the aforesaid shortcomings of the conventional composite multilayer glass sheets, it is an object of the present invention to provide a composite multilayer glass sheet for use as a motor vehicle window glass, which is light in weight and which also prevents light, directed from within the passenger compartment toward the exterior thereof, from being reflected by an outer glass layer, for thereby allowing better visibility through the composite multilayer glass sheet.

According to the present invention, there is provided a composite multilayer glass sheet for use in a motor vehicle, comprising an outer glass layer facing outside the motor vehicle, an inner glass layer facing inside the motor vehicle, the inner glass layer extending parallel to the outer glass layer and being spaced from the outer glass layer with an air layer defined therebetween, and an nonreflective film disposed on a surface of at least the outer glass layer which faces the air layer. A resin film is applied to a surface of the inner glass layer for making the inner glass layer mechanically stronger.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
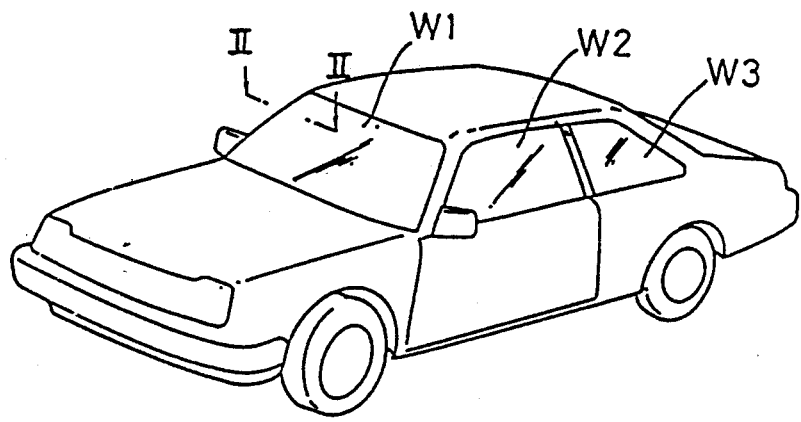
FIG. 1 is a perspective view of an automobile incorporating a composite multilayer glass sheet according to a preferred embodiment of the present invention.

FIG. 1 shows an automobile in which a composite multilayer glass sheet according to a preferred embodiment of the present invention is used as a window glass. The automobile has a front window glass or windshield W1, a pair of front side window glasses W2 (one shown), and a pair of rear side window glasses W3. The composite multilayer glass sheet of the present invention is preferably used as the front window glass W1.

Figure 2:
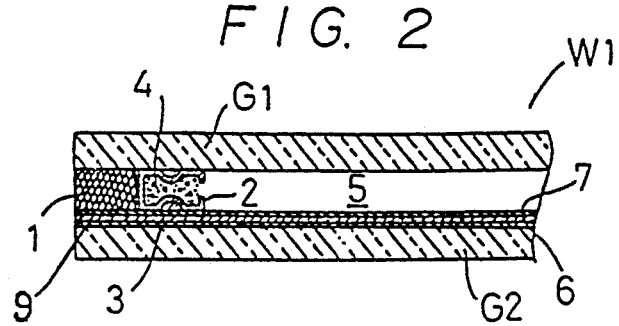
FIG. 2 is an enlarged fragmentary cross-sectional view taken along line II—II of FIG. 1.

As shown in FIG. 2, the composite multilayer glass sheet W1 comprises an outer glass layer G1 and an inner glass layer G2 which are spaced a distance from each other and extend parallel to each other. A sealing member 1 of polysulfide or silicone fills the space between the peripheral edges of the outer and inner glass layers G1, G2. A spacer 2, which is disposed just inside the sealing member 1, is interposed between and bonded to the outer and inner glass layers G1, G2 by an adhesive 3 of butyl rubber. The spacer 2 has an inner volume which is filled with a desiccant material 4.

The outer glass layer G1, the inner glass layer G2, and the spacer 2 jointly define therebetween an air layer 5 which is isolated from outside the composite multilayer glass sheet W1.

Figure 3:
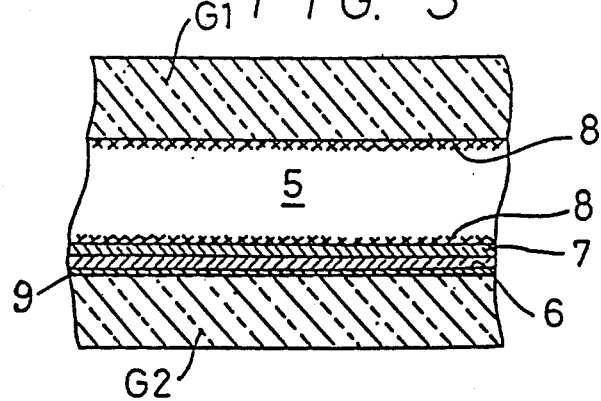
FIG. 3 is an enlarged fragmentary cross-sectional view of the composite multilayer glass sheet shown in FIG. 2.
Figure 4:
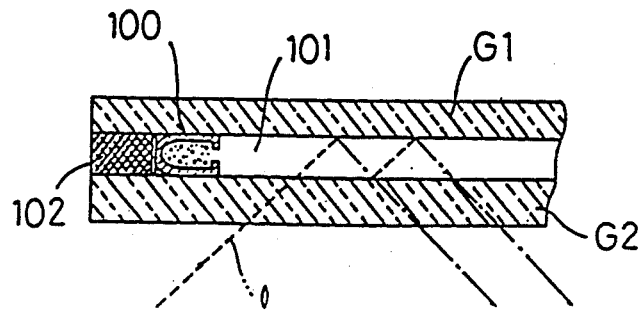
FIG. 4 is a fragmentary cross-sectional view of a conventional composite multilayer glass sheet.

Each of the outer and inner glass layers G1 G2 is in the form of a raw glass sheet or a tempered glass sheet. On the surface of the inner glass sheet G2 which faces the air layer 5, there is deposited, as by sputtering, a heat reflecting film 9 in the form of a metal oxide film, a metal nitride film, or a precious metal film such as of Ag, or a film of a mixture of these materials. Moreover, as shown in FIG. 3, a film 7 of polyethylene terephthalate, having a thickness ranging from 0.05 to 0.175 mm, is applied to the heat reflecting film 9 through an intermediate film 6 of polyvinyl butyral, ethylene vinyl acetate, or the like, having a thickness ranging from 0.38 to 0.90 mm. These films 6, 7 applied to the inner glass layer G2 make the inner glass layer G2 as mechanically strong as a laminated glass sheet.

Instead of applying the film 7 through the intermediate film 6, a non-yellowing film of polyurethane, a transparent film of vinyl chloride or polyvinyl chloride, or the like may directly be applied to the heat reflecting film 9 on the inner glass sheet G2. The film 7 or the alternative film may be applied to the surface of the inner glass layer G2 remote from the air layer 5, i.e., facing into the passenger compartment of the automobile. If the film 7 or the alternative film is applied to the surface of the inner glass layer G2 which faces the air layer 5, then the film is increased in durability. If the film 7 or the alternative film is applied to the surface of the inner glass layer G2 remote from the air layer 5, then the film gives the compartment-side surface of the inner glass layer G2 a cushioning property.

As shown in FIG. 3, a nonreflective film or reflection resistant film 8 is deposited by sputtering or vacuum evaporation on the air-layer-side surface of the outer glass layer G1 and the film 7 applied to the inner glass layer G2.

The nonreflective film 8 may comprise, for example, a first dielectric layer having a high refractive index, a metal or metal alloy layer, a second dielectric layer having a high refractive index, and a dielectric layer having a low refractive index, these layers being successively deposited on the glass layer. The first dielectric layer is made of a material having a refractive index ranging from 2.00 to 2.40 and an optical film thickness ranging from $0.03 \times \lambda_0/4$ to $0.50 \times \lambda_0/4$ ($\lambda_0$ is the central wavelength). Specifically, the material of the first dielectric layer is titanium oxide, tantalum oxide, zirconium oxide, praseodymium titanate, hafnium oxide, zinc sulfide, tin oxide, indium oxide, or a mixture of indium oxide and tin oxide (ITO). The metal or metal alloy layer has a thickness ranging from 26Å to 46Å, and is made of titanium, chromium, zirconium, molybdenum, nickel, an alloy of nickel and chromium, or stainless steel. The second dielectric layer is made of the same material and has the same refractive index as the first dielectric layer, but has an optical film thickness ranging from $0.06 \times \lambda_0/4$ to $1.30 \times \lambda_0/4$. The dielectric layer having a low refractive index has a refractive index range from 1.37 to 1.50 and an optical film thickness ranging from $1.00 \times \lambda_0/4$ to $1.08 \times \lambda_0/4$, and is made of magnesium fluoride or silicon oxide.

The nonreflective film 8 may not be of a composite multilayer structure, but may comprise a silicon oxide layer only. The nonreflective film 8 on the inner glass layer G2 may be dispensed with.

With the present invention, as described above, the nonreflective film 8 is deposited on the air-layer-side surface of at least the outer glass layer G1 of the multilayer composite glass sheet. The nonreflective film 8 is effective to prevent multiple images from being reflected back into the passenger compartment, so that the composite multilayer composite glass sheet can provide better visibility therethrough. The synthetic resin film 7 applied to one surface of the inner glass sheet G2 makes the inner glass sheet G2 as mechanically strong as a laminated glass, and also renders the inner glass sheet G2 and hence the composite multilayer composite glass sheet lightweight.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A composite multilayer glass sheet for use in a motor vehicle, comprising:
   (a) an outer glass layer;
   (b) an inner glass layer spaced a distance apart and parallel to the outer glass layer to form a common peripheral edge and defining an air layer therebetween;
   (c) a heat reflecting film disposed on a surface of the inner glass layer facing the air layer;
   (d) a first intermediate film made of a material selected from a group consisting f polyvinyl butyral and ethylene vinyl acetate, disposed on a surface of the heat reflecting film facing the air layer and a second intermediate film of polyethylene terephthalate disposed on a surface of the first, intermediate film facing the air layer, said first and second intermediate films being lightweight and providing mechanical strength for the inner glass layer;
   (e) a first nonreflective film made of a single layer of silicon oxide, disposed on a surface of the outer glass layer facing the air layer;
   (f) a second nonreflective film made of a single layer of silicon oxide, disposed on a surface of the second intermediate film facing the air layer;
   (g) a spacer interposed between and bonded to the outer and inner glass layers by an adhesive; and
   (h) a sealing member for sealing the peripheral edge formed by the outer and inner glass layers.

2. A composite multilayer glass sheet for use in a motor vehicle, comprising:
   (a) an outer glass layer;
   (b) an inner glass layer spaced a distance apart and parallel to the outer glass layer to form a common peripheral edge and defining an air layer therebetween;
   (c) a heat reflecting film disposed on a surface of the inner glass layer facing the air layer;
   (d) a first intermediate film made of a material selected from a group consisting of polyvinyl butyral and ethylene vinyl acetate, disposed on a surface of the heat reflecting film facing the air layer and a second intermediate film of polyethylene terephthalate disposed on a surface of the first intermediate film facing the air layer, the first and second intermediate films being lightweight and providing mechanical strength for the inner glass layer;
   (e) a first nonreflective film disposed on a surface of the outer glass layer facing the air layer;
   (f) a second nonreflective film disposed on a surface of the second intermediate film facing the air layer, the first and the second nonreflective films each comprising,
      (i) a first dielectric layer comprising a material having a refractive index ranging from 2.00 to 2.4 and having an optical film thickness ranging from $0.03 \cdot \pi_0/4$ to $0.50 \cdot \lambda_0/4$, $\lambda_0$ being a central wavelength,
      (ii) a metal alloy, having a thickness ranging from 26 to 46 Angstroms, disposed on the first dielectric layer,
      (iii) a second dielectric layer disposed on the metal alloy layer having a refractive index equivalent to the first dielectric layer and having an optical film thickness ranging from $0.06 \cdot \lambda_0/4$ to $1.30 \cdot \lambda_0/4$, and
      (iv) a third dielectric layer, disposed on the second dielectric layer, having a refractive index ranging from 1.37 to 1.50 and has an optical film thickness ranging from $1.00 \cdot \lambda_0/4$ to $1.08 \cdot \lambda_0/4$;
   (f) a spacer interposed between and bonded to the outer and inner glass layers by an adhesive; and
   (g) a sealing member for sealing the peripheral edge formed by the outer and inner glass layers.

3. A composite multilayer glass sheet as recited in claim 2, wherein the first dielectric layer is made of a material selected from a group consisting of titanium oxide, tantalum oxide, zirconium oxide, praseodymium titanate, hafnium oxide, zinc sulfide, tin oxide, indium oxide, and a mixture of indium oxide and tin oxide.

4. A composite multilayer glass sheet as recited in claim 2, wherein the metal alloy layer is made of a material selected from a group consisting of titanium, chromium, zirconium, molybdenum, nickel, an alloy of nickel and chromium, and stainless steel.

5. A composite multilayer glass sheet as recited in claim 2, wherein the third dielectric layer is made of a material selected from a group consisting of magnesium fluoride or silicon oxide.

* * * * *

UNITED STATES PATENT AND TRADEMARK OFFICE
CERTIFICATE OF CORRECTION

PATENT NO. : 5,169,694

DATED : December 8, 1992

INVENTOR(S) : Masaaki Endo et al.

It is certified that error appears in the above-identified patent and that said Letters Patent is hereby corrected as shown below:

Column 1, line 39, "laminated glass" should read --glass laminate--; line 45, strike "the" (second occurrence) after "of". Column 3, line 30, "range" should read --ranging--. Column 4, line 2, after "consisting", "f" should read --of--; line 47, "$\pi_0$" should read --$\lambda_0$--.

Signed and Sealed this

Ninth Day of November, 1993

Attest:

BRUCE LEHMAN

Attesting Officer

Commissioner of Patents and Trademarks